No. 819,053. PATENTED MAY 1, 1906.
J. F. FIRESTONE.
TRUCK.
APPLICATION FILED JUNE 19, 1905.

WITNESSES:
Carl Stoughton

INVENTOR
Joseph F. Firestone
BY
ATTORNEYS ated May 1, 1906.

UNITED STATES PATENT OFFICE.

JOSEPH F. FIRESTONE, OF COLUMBUS, OHIO.

TRUCK.

No. 819,053.    Specification of Letters Patent.    Patented May 1, 1906.

Application filed June 19, 1905. Serial No. 265,936.

*To all whom it may concern:*

Be it known that I, JOSEPH F. FIRESTONE, a citizen of the United States, residing at Columbus, in the county of Franklin and State of Ohio, have invented certain new and useful Improvements in Trucks, of which the following is a specification.

My invention relates to a new and useful improvement in trucks, and more particularly to a truck or movable rack for handling running-gears of vehicles.

The object of the invention, more especially, is to provide a truck or movable rack arranged with a number of longitudinal openings so shaped as to receive the axle ends of a number of vehicle running-gears and support the same in vertical position.

Another feature resides in the provision of a device whereby a number of running-gears are so supported that they may be painted, finished, dried, and moved from place to place without being handled by the painter or workman.

Finally, the object of the invention is to provide a device of the character described that will be strong, durable, and efficient and one which will be simple and inexpensive to construct.

With the above and other objects in view the invention consists of the novel details of construction and operation, a preferable embodiment of which is described in the specification and illustrated in the accompanying drawings, wherein—

Figure 1:
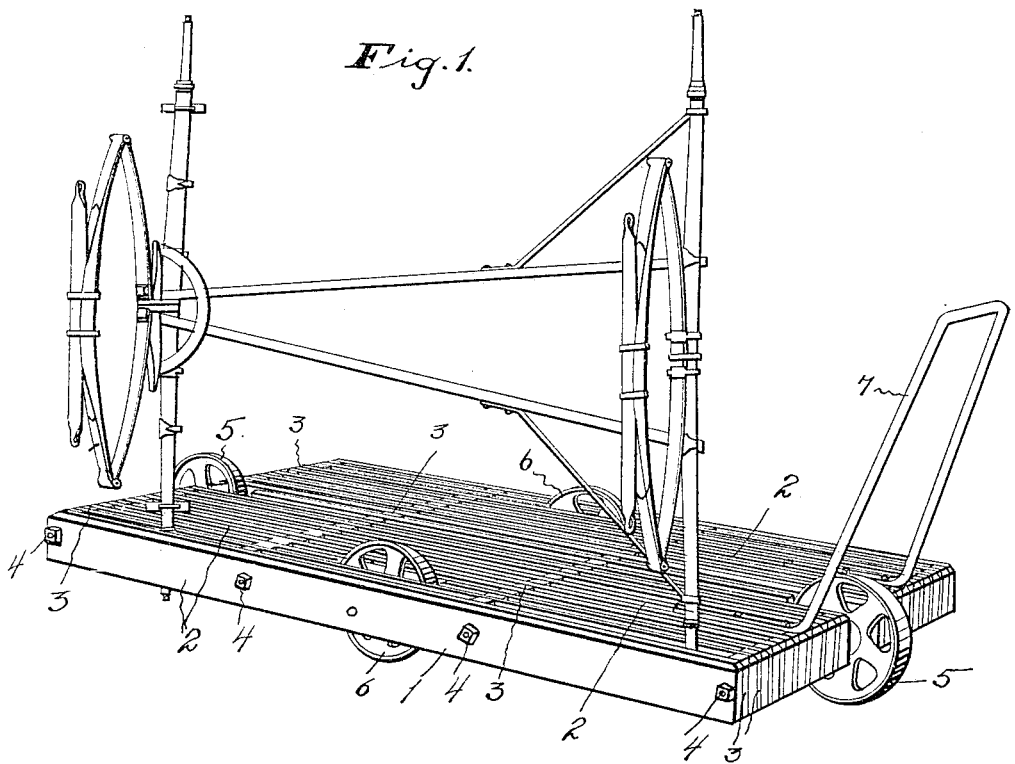
Figure 2:
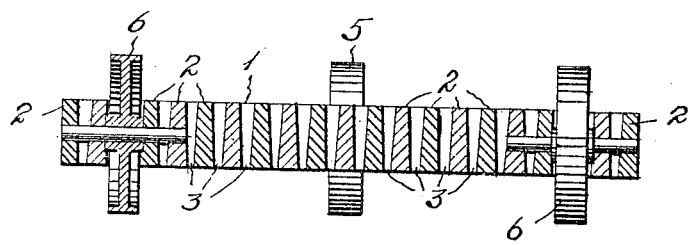
Figure 3:
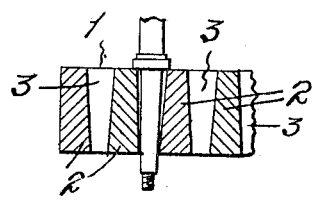

Figure 1 is a perspective view of my improved truck, showing a running-gear supported thereon. Fig. 2 is a transverse vertical sectional view taken across the central portion of the truck and showing one of the center wheels in elevation, and Fig. 3 is a partial transverse sectional view showing one of the axle ends of the running-gear in position between the supporting-rails.

In the drawings the numeral 1 designates the truck-platform or rack proper, which is composed of a number of longitudinal rails or strips 2, inclined on both sides, so as to taper upwardly, and spaced apart by downwardly-inclined and tapering blocks 3. By this arrangement the slots or spaces provided between the rails 2 are of such shape as to readily and snugly receive the axle ends, and thus support the running-gears with considerable rigidity, thereby mantaining them in an upright position and preventnig them from swaying or striking against each other. The blocks 3 are generally arranged at each end of the truck and also intermediate the ends, as clearly shown in Fig. 1, and are held in position by suitable bolts 4, which pass therethrough and also passing through the rails 2 securely fasten the parts together. At each end of the truck 1 and in the central portion thereof the rails 2 and blocks 3 are cut away and suitable truck-wheels 5 mounted in the openings thus provided. At each side of the central portion of the truck the rails 2 are also broken or cut away and wheels 6 like the wheels 5 provided. In this way the truck is supported on the wheels 5 and 6 and may be readily moved from place to place. For the purpose of handling the truck I provide at one end over one of the wheels 5 an ordinary bail-handle 7, secured to the truck on either side of the said wheels. The wheels 5 and 6 are of such height and so mounted in the truck 1 as to support the same a slight distance above the ground to avoid the ends of the axles, which sometimes project below the truck or rack, from coming in contact with the ground or floor.

It is a well-known fact that in the manufacture of running-gears after the parts have been constructed and put together considerable painting and finishing is necessary and more or less handling of the running-gears is required, and when one or more running-gears have been freshly painted it is impossible to move the same without rubbing off the paint, and it has generally been the custom to allow them to remain in one position until dry. By employing my truck a number of running-gears may be assembled thereon by inserting the ends of the axles on one side of the gears in the spaces or openings between the rails. The gears thus supported may be readily painted and finished, and if desirable the truck on which they are disposed may be moved from place to place. It will also be apparent that should it be desirable to enamel the gears or run them into a drying-room the truck may be readily wheeled about without the necessity of the workmen handling the gears. The truck also affords an excellent device for transporting the running-gears from one building to another and allowing a single workman to move several running-gears with comparatively little labor.

Having now fully described my invention, what I claim, and desire to secure by Letters Patent, is—

A wheeled truck or rack for supporting running-gears comprising a plurality of tapered rails assembled together in fixed relation so as to provide tapering openings or spaces for the reception of the ends of the axles of the running-gears.

In testimony whereof I affix my signature in presence of two witnesses.

JOSEPH F. FIRESTONE.

Witnesses:
A. L. PHELPS,
M. B. SCHLEY.